United States Patent
Koike

(10) Patent No.: US 9,984,259 B2
(45) Date of Patent: May 29, 2018

(54) MEDIA PROCESSING DEVICE, PRINTING DEVICE AND CONTROL METHOD OF A MEDIA PROCESSING DEVICE

(71) Applicant: Seiko Epson Corporation, Tokyo (JP)

(72) Inventor: Toshiaki Koike, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 251 days.

(21) Appl. No.: 14/015,056

(22) Filed: Aug. 30, 2013

(65) Prior Publication Data
US 2014/0062674 A1    Mar. 6, 2014

(30) Foreign Application Priority Data

Aug. 30, 2012  (JP) ................................. 2012-189912
Jun. 11, 2013  (JP) ................................. 2013-122326

(51) Int. Cl.
*G06K 7/10* (2006.01)
*G06K 15/02* (2006.01)
*H04N 1/32* (2006.01)

(52) U.S. Cl.
CPC ....... *G06K 7/10009* (2013.01); *G06K 15/021* (2013.01); *H04N 1/32138* (2013.01)

(58) Field of Classification Search
None
See application file for complete search history.

(56) References Cited

U.S. PATENT DOCUMENTS

| | | | | |
|---|---|---|---|---|
| 5,648,765 A | * | 7/1997 | Cresap | G06K 7/10059 340/10.2 |
| 6,354,493 B1 | * | 3/2002 | Mon | G06K 7/0008 235/380 |
| 6,404,335 B1 | * | 6/2002 | Ohno | G06K 1/121 340/5.1 |
| 6,644,771 B1 | * | 11/2003 | Silverbrook | 347/19 |
| 7,592,915 B2 | * | 9/2009 | Liu | B07C 5/3412 340/572.1 |
| 8,219,053 B2 | * | 7/2012 | Mejia | G06K 7/0008 455/114.1 |
| 8,245,739 B1 | * | 8/2012 | Wade | B67D 1/0888 141/104 |
| RE43,918 E | * | 1/2013 | Tuttle | G01R 31/01 324/605 |
| 8,564,412 B2 | * | 10/2013 | Nikitin | G06K 7/10039 340/10.32 |
| 9,477,292 B1 | * | 10/2016 | Murali | G06F 1/3243 |
| 2002/0175806 A1 | * | 11/2002 | Marneweck | G06K 7/0008 340/10.33 |
| 2003/0137403 A1 | * | 7/2003 | Carrender | G06K 7/0008 340/10.4 |

(Continued)

FOREIGN PATENT DOCUMENTS

JP    2003-234673 A    8/2003
JP    2005-215958 A    8/2005

(Continued)

*Primary Examiner* — Quan-Zhen Wang
*Assistant Examiner* — Chico A Foxx
(74) *Attorney, Agent, or Firm* — Nutter McClennen & Fish LLP; John J. Penny, Jr.; Alex Nagorniy

(57) ABSTRACT

When writing information to the IC tag of a medium, the control unit 54 of a printer 1 determines if a specific area in the storage space of the IC tag is in an initialized state, and writes to the IC tag if the IC tag is in the specific state.

9 Claims, 7 Drawing Sheets

(56) References Cited

U.S. PATENT DOCUMENTS

| | | | | |
|---|---|---|---|---|
| 2004/0141200 | A1* | 7/2004 | Minami | G06F 3/1204 358/1.15 |
| 2005/0114326 | A1* | 5/2005 | Smith et al. | 707/3 |
| 2005/0121505 | A1* | 6/2005 | Metz | G06Q 50/24 235/375 |
| 2005/0285742 | A1* | 12/2005 | Charych | G01S 3/20 340/572.1 |
| 2006/0202800 | A1* | 9/2006 | Ohashi | G06K 7/0008 340/10.1 |
| 2006/0290493 | A1* | 12/2006 | Taki | G06K 17/00 340/568.1 |
| 2007/0131769 | A1* | 6/2007 | Tanaka | B65C 11/0289 235/451 |
| 2007/0252700 | A1* | 11/2007 | Ishihara | B65C 9/188 340/572.7 |
| 2008/0079585 | A1* | 4/2008 | Hirota et al. | 340/572.1 |
| 2008/0139181 | A1* | 6/2008 | Lokshin | G06Q 30/02 455/414.1 |
| 2008/0163008 | A1* | 7/2008 | Jacob | G06F 12/0895 714/699 |
| 2009/0002746 | A1* | 1/2009 | Niwa | B41J 3/4075 358/1.15 |
| 2009/0067910 | A1 | 3/2009 | Sugiyama | |
| 2009/0113513 | A1* | 4/2009 | Dorney | G06Q 30/0255 725/135 |
| 2009/0174531 | A1* | 7/2009 | Ohashi et al. | 340/10.52 |
| 2009/0256672 | A1* | 10/2009 | Yamamoto | G06Q 10/08 340/5.2 |
| 2009/0287891 | A1* | 11/2009 | Nakano | B41J 2/17546 711/155 |
| 2009/0307529 | A1* | 12/2009 | Kim | 714/37 |
| 2010/0141456 | A1* | 6/2010 | Hollander | G06K 19/0716 340/572.8 |
| 2010/0245058 | A1* | 9/2010 | Kojima | B41J 3/4075 340/10.52 |
| 2011/0040757 | A1* | 2/2011 | Kossi | G06F 17/3002 707/737 |
| 2011/0289256 | A1* | 11/2011 | Bartlett | G06F 12/0844 711/3 |
| 2011/0298593 | A1* | 12/2011 | Sugiyama | G06K 7/10009 340/10.51 |
| 2012/0005557 | A1* | 1/2012 | Mardiks | G06F 11/10 714/763 |

FOREIGN PATENT DOCUMENTS

| | | |
|---|---|---|
| JP | 2009-083459 A | 4/2009 |
| JP | 2011-204011 A | 10/2011 |

* cited by examiner

MEDIA PROCESSING DEVICE, PRINTING DEVICE AND CONTROL METHOD OF A MEDIA PROCESSING DEVICE

BACKGROUND

1. Technical Field

The present disclosure relates to a media processing device that can write information to the IC tag of a medium, to a method of controlling the media processing device, and to a printing device.

2. Related Art

Media processing devices (such as recording devices and label printers) that can write information to media (including recording media and labels) having an affixed or embedded contactless IC tag (contactless tag, RFID tag) are known from the literature. See, for example, Japanese Unexamined Patent Appl. Pub. JP-A-2009-83459.

With media processing devices such as above that write information to an IC tag, checking if unintended information was written to the IC tag cannot be easily confirmed by visually examining the tag. Determining whether or not information can be written to a particular IC tag is therefore necessary.

SUMMARY

A media processing device according to one aspect of the disclosure comprises a data read/write unit configured to write information to an IC tag of media, and to read information from the IC tag, by radio signal; and a control unit configured to control writing and reading the IC tag by the data read/write unit, wherein the control unit is configured to determine if a specific area in the storage space of the IC tag is in a specific state and to control the data read/write unit to write information to the IC tag if the specific area is in the specific state.

In a media processing device according to another aspect of the disclosure, the control unit does not write information to the IC tag if the control unit determines the specific area in the storage space of the IC tag is not in the specific state.

In a media processing device according to another aspect of the disclosure, the data read/write unit broadcasts a radio signal and detects an IC tag that can communicate; and the control unit determines the number of detected IC tags when the data read/write unit detects an IC tag that can communicate.

In a media processing device according to another aspect of the disclosure, when the number of detected IC tags is 2 or more, the control unit determines if a specific area in each detected IC tag is in the specific state, and if the number of IC tags in which the specific area is in the specific state is 1, writes to the IC tag having the specific area in the specific state.

In a media processing device according to another aspect of the disclosure, when the number of detected IC tags is 2 or more, In a media processing device according to another aspect of the disclosure, the media includes a plurality of IC tags disposed with an interval therebetween; a conveyance unit configured to convey the media; and the data read/write unit is configured to write to the IC tag conveyed to a data read/write position by the conveyance unit.

Another aspect of the disclosure is a control method of a media processing device, comprising: conveying an IC tag disposed to media to a data read/write position; determining if a specific area in the storage space of the IC tag is in a specific state after the IC tag is conveyed to the data read/write position; and if the specific area is in the specific state, writing to the IC tag.

A control method according to another aspect of the disclosure further comprises detecting the number of IC tags after the IC tag is conveyed to the data read/write position; determining the number of detected IC tags; and if the number of IC tags is 1, determining if a specific area in the storage space of the IC tag is in the specific state.

DESCRIPTION OF EMBODIMENTS

A preferred embodiment of the present disclosure is described below with reference to the accompanying figures.

Figure 1:
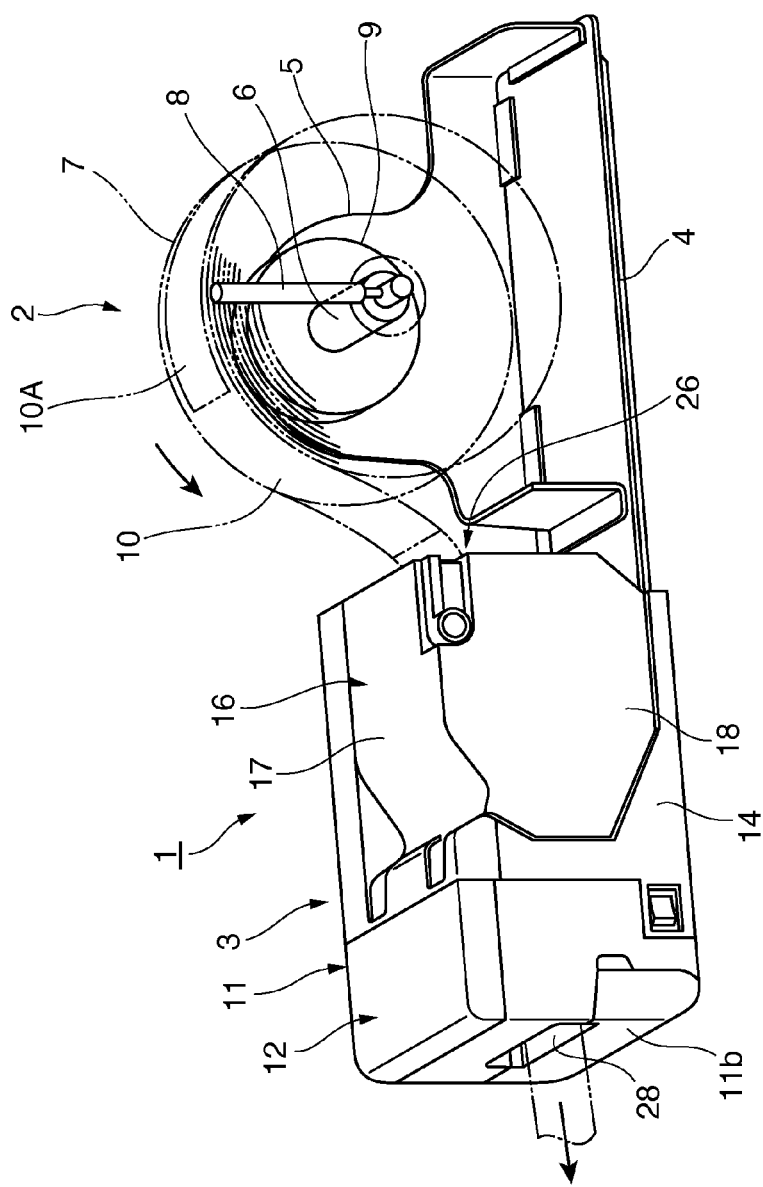
FIG. 1 is an oblique view of a printer according to a preferred embodiment of the disclosure.

FIG. 1 is an oblique view of a printer 1 as an example of a media processing device according to this embodiment of the disclosure.

The printer 1 according to this embodiment of the disclosure is installed at an airline checkout counter in an airport, for example, and used to print baggage tags. A baggage tag printed by the printer 1 has an embedded IC (integrated circuit) tag, and predefined information such as the flight number of the plane on which the baggage is to be loaded, and the date the baggage tag is printed, is recorded in the IC tag. Predefined information such as the flight number and the name of the passenger (owner of the baggage) is also printed on the face of the baggage tag.

The printer 1 includes a paper feed device 2 that supplies roll paper 7 (media) to the printer unit 3 that prints. The paper feed device 2 includes a base 4 that can connect to and disconnect from the printer unit 3, a vertical support 5 attached to the base 4, and a roll paper spindle 6 attached horizontally to the top part of the vertical support 5. The roll paper 7 fits onto the roll paper spindle 6 from the distal end thereof. A stop 8 that prevents the roll paper from slipping off the roll paper spindle 6 is attached perpendicularly to the roll paper spindle 6 at the exposed end of the roll paper spindle 6. A disk-shaped spacer 9 for adjusting to the width of the roll paper is removably attached to the base end of the roll paper spindle 6, thereby enabling installing and using roll paper of different widths.

The roll paper 7 in this embodiment has label paper 10 (media) for printing baggage tags used in an airport, for example, wound into a roll. More specifically, the roll paper 7 has labels 10 of a specific length affixed to a continuous backer of a constant width. An RFID (radio frequency identification) tag 10A (IC tag) to which specific information is written is affixed or embedded (mounted, disposed) at the leading end part of each label 10.

The base 4 can alternatively be used as a tray for fanfold paper, which is another type of continuous paper. In this implementation, the paper feed device 2 can be used as a device that feeds both roll paper 7 and fanfold paper.

The printer unit 3 has a printer case 11 shaped generally like a long rectangular box. A cover 16 that opens and closes freely is disposed to the top of the printer case 11. A paper entrance 26 is formed between the back end 11a of the printer case 11 (FIG. 2) and the front end of the cover 16. A paper exit 28 is formed at the front 11b of the printer case 11 in the middle between the top and bottom.

Figure 2:
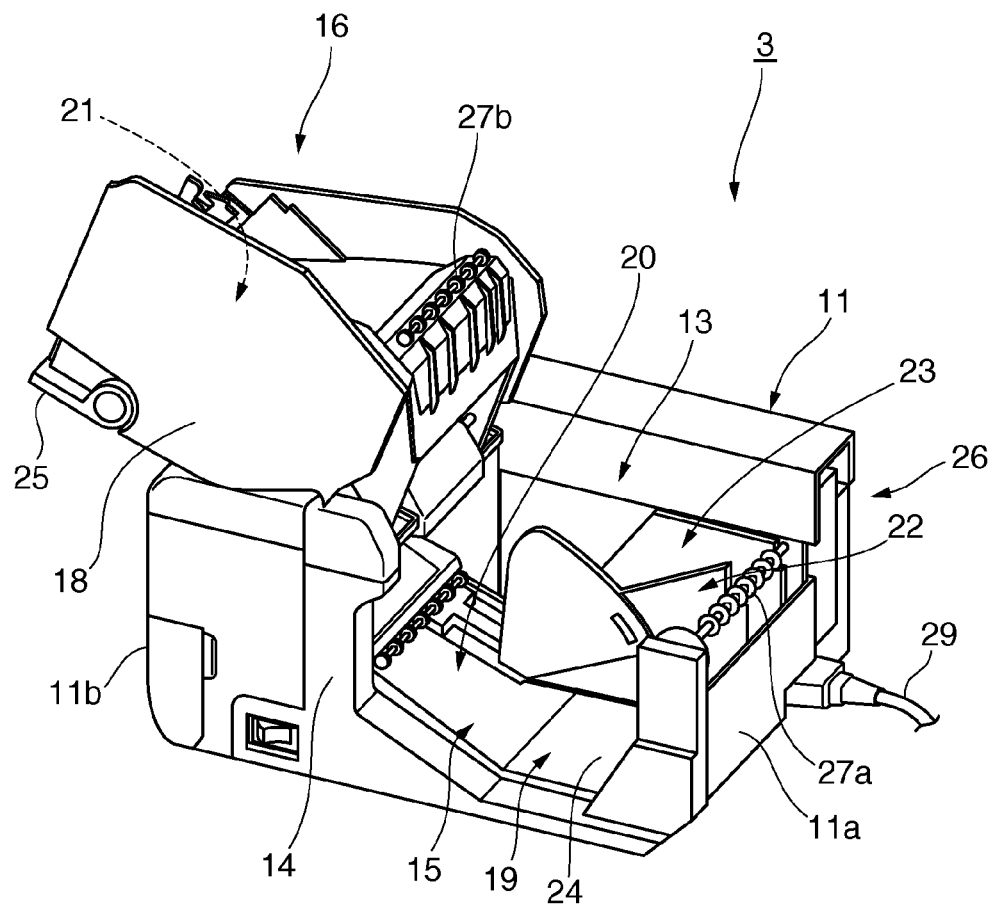
FIG. 2 is an oblique view of the printer when the cover is open.

FIG. 2 is an oblique view of the printer unit 3 with the cover 16 open.

As shown in FIG. 2, pivoting the cover 16 open exposes a top opening 13. A side opening 15 contiguous to the top opening 13 is formed at one side 14 of the printer case 11.

When closed as shown in FIG. 1, the cover 16 closes the top opening 13 and side opening 15. The cover 16 includes a top cover part 17 that closes the top opening 13, and a side cover part 18 that closes the side opening 15. The cover 16 pivots at the end of the top cover part 17 at the front of the printer unit 3 from the closed position shown in FIG. 1 to the fully open position shown in FIG. 2. When the cover 16 opens, a conveyance path 19 for the labels 10 formed inside the printer case 11, and a paper stop 20 formed at the top of the conveyance path 19, are open and can be accessed from the top opening 13 and side opening 15.

One side of the width of the conveyance path 19, that is, one side of the printer unit 3, is a first paper guide 21 formed on the inside side of the side cover part 18. The other side of the width is either a second paper guide 22 that is removably installed to the bottom 24, which is the bottom of the conveyance path 19, or a third paper guide 23. When the second paper guide 22 is installed, the label 10 paper can be guided by the first paper guide 21 and second paper guide 22. When the second paper guide 22 is not installed, the label 10 paper can be guided by the first paper guide 21 and the third paper guide 23.

A lower guide roller 27a is disposed to the printer case 11 side, and an upper guide roller 27b that is opposite the lower guide roller 27a when the cover 16 is in the closed position shown in FIG. 1 is disposed to the cover 16 side, inside the paper entrance 26.

The printer unit 3 connects to a host computer 55 (FIG. 4) described below through a USB cable 29, and communicates print commands and print data with the host computer 55.

Figure 3:
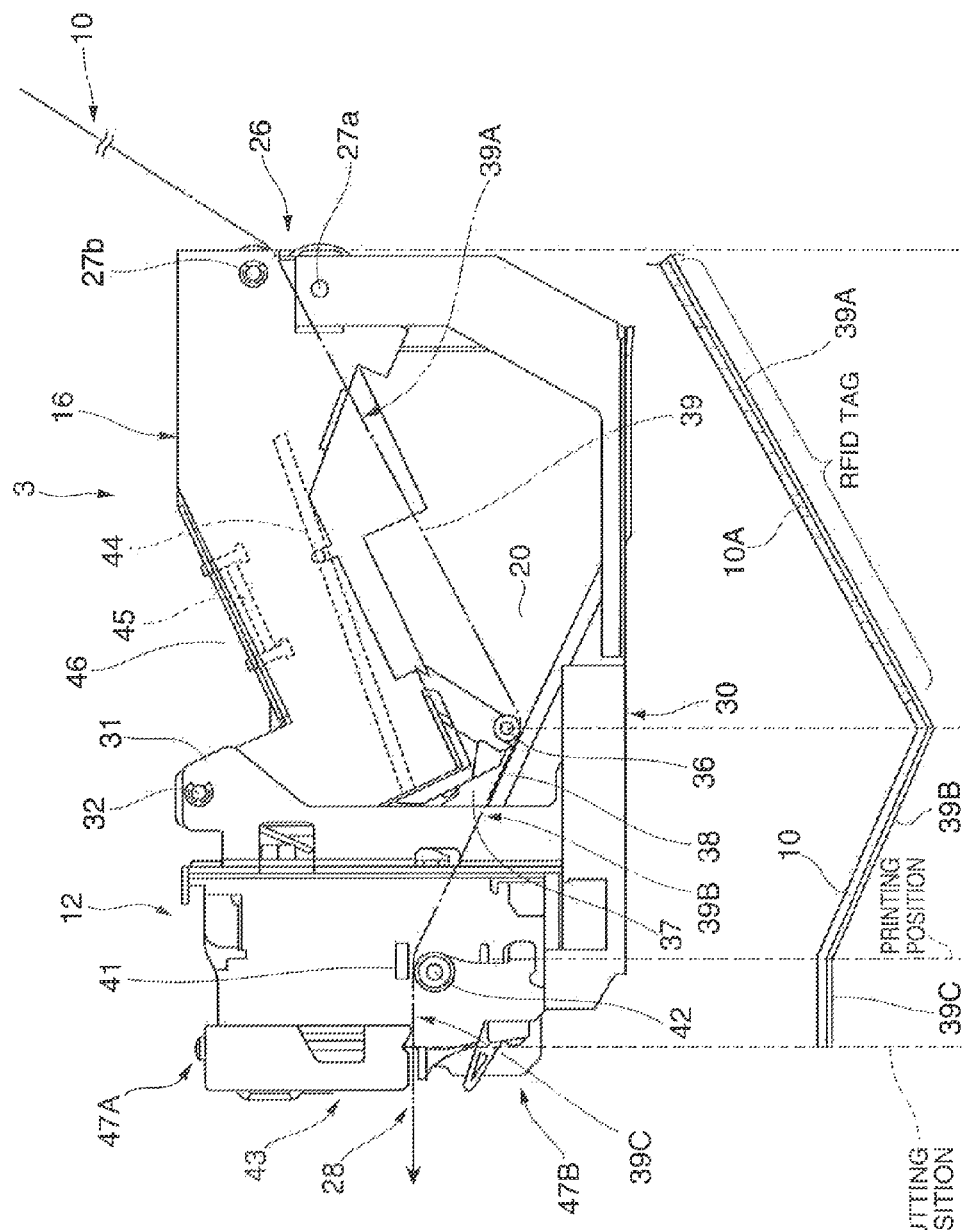
FIGS. 3 (A) and 3 (B) describe internal mechanisms of the printer.

FIG. 3 (A) describes the internal configuration of the printer unit 3, and shows the length of the printer 1 from one transverse side (width). FIG. 3 (B) schematically shows the conveyance path 39 extracted from FIG. 3 (A).

The internal mechanism of the printer unit 3 has the components of the printer unit 3 mounted on a sheet metal main frame 30 that is covered by the printer case 11. Left and right support arms 31 that protrude vertically are disposed to the main frame 30, a hinge pin 32 spans horizontally widthwise to the printer case 11 between the support arms 31, and the cover 16 can pivot freely on the axis of the hinge pin 32.

A tension rod 36 extends widthwise at a position below the paper entrance 26 and at the front of the paper stop 20 inside the printer unit 3. A label 10 paper conveyance path 39 that passes the tension rod 36 and a platen roller 42 located downstream from the tension rod 36 is formed between the paper entrance 26 and paper exit 28.

The conveyance path 39 includes an upstream path slope 39A near the paper entrance 26, a downstream path slope 39B, and a horizontal path 39C further downstream near the paper exit 28. The upstream path slope 39A extends at a downward angle from the paper entrance 26 to the tension rod 36. The downstream path slope 39B continues on an upward slope downstream from the tension rod 36 to the platen roller 42. The downstream path slope 39B is formed by paper guides 37, 38 disposed in vertical opposition. The horizontal path 39C continues horizontally to the front downstream from the platen roller 42 to the paper exit 28.

A thermal head 41 that prints on the labels 10 is disposed facing down to the downstream path slope 39B, and the platen roller 42 is located below and opposite the thermal head 41. The platen roller 42 is disposed to apply pressure to the heat-emitting face of the thermal head 41, and the label 10 paper is conveyed by rotation of the platen roller 42. An automatic paper cutter 43 is disposed to the horizontal path 39C near the paper exit 28, and the print medium (such as the label 10 paper) printed by the thermal head 41 is cut by the automatic paper cutter 43.

To print on the label 10 paper, the user first opens the cover 16, and pulls and inserts the end of the label 10 paper set in the paper feed device 2 from the paper entrance 26. The label 10 paper is guided by the first paper guide 21 and the second paper guide 22 or third paper guide 23 through the upstream path slope 39A to the tension rod 36. The label 10 paper is then conveyed from the tension rod 36 along the downstream path slope 39B and between the thermal head 41 and platen roller 42, through the horizontal path 39C, and out from the paper exit 28. When the cover 16 is then closed, the leading end of the label 10 is held between the platen roller 42 and thermal head 41, and can be conveyed.

A tag reader/writer 46 (data reader/writer) that writes data to and reads data from an RFID tag 10A is disposed inside the printer case 11.

The tag reader/writer 46 communicates wirelessly with the RFID tag 10A by means of an antenna 44 and RF communication circuit 45. As shown in FIG. 3 (A), the antenna 44 is disposed facing the upstream path slope 39A (conveyance path), and the upstream path slope 39A is the data read/write position where the tag reader/writer 46 writes data and reads data. More specifically, the tag reader/writer 46 writes data and reads data while the RFID tag 10A affixed to the label 10 is located in the range of the upstream path slope 39A.

An RFID tag 10A is a passive IC tag that has an antenna for receiving RF signals transmitted from an external device such as the tag reader/writer 46, and drives an IC chip by means of power induced in the antenna. The tag reader/writer 46 and RFID tag 10A in this embodiment of the disclosure send and receive radio signals using a common protocol for RF tags.

More specifically, to write data to or read data from the RFID tag 10A, the tag reader/writer 46 first sends a carrier wave of a specific frequency, and sends a detection signal superimposed on the carrier wave. When EMF is induced in the antenna of the RFID tag 10A by the carrier wave transmitted by the tag reader/writer 46, the IC chip of the RFID tag 10A turns on due to the induced power, receives the detection signal, and then sends a signal responding to the detection signal. When the response signal sent by the RFID tag 10A is received, the tag reader/writer 46 sets the RFID tag 10A as the target for writing data and reading data, and sends a signal to start writing and reading data, while continuing to output the carrier wave. Next, the tag reader/writer 46 and RFID tag 10A communicate wirelessly while the tag reader/writer 46 continues outputting the carrier wave, reads data recorded in the RFID tag 10A, and writes data to the rewritable storage area of the IC chip of the RFID tag 10A.

Figure 4:
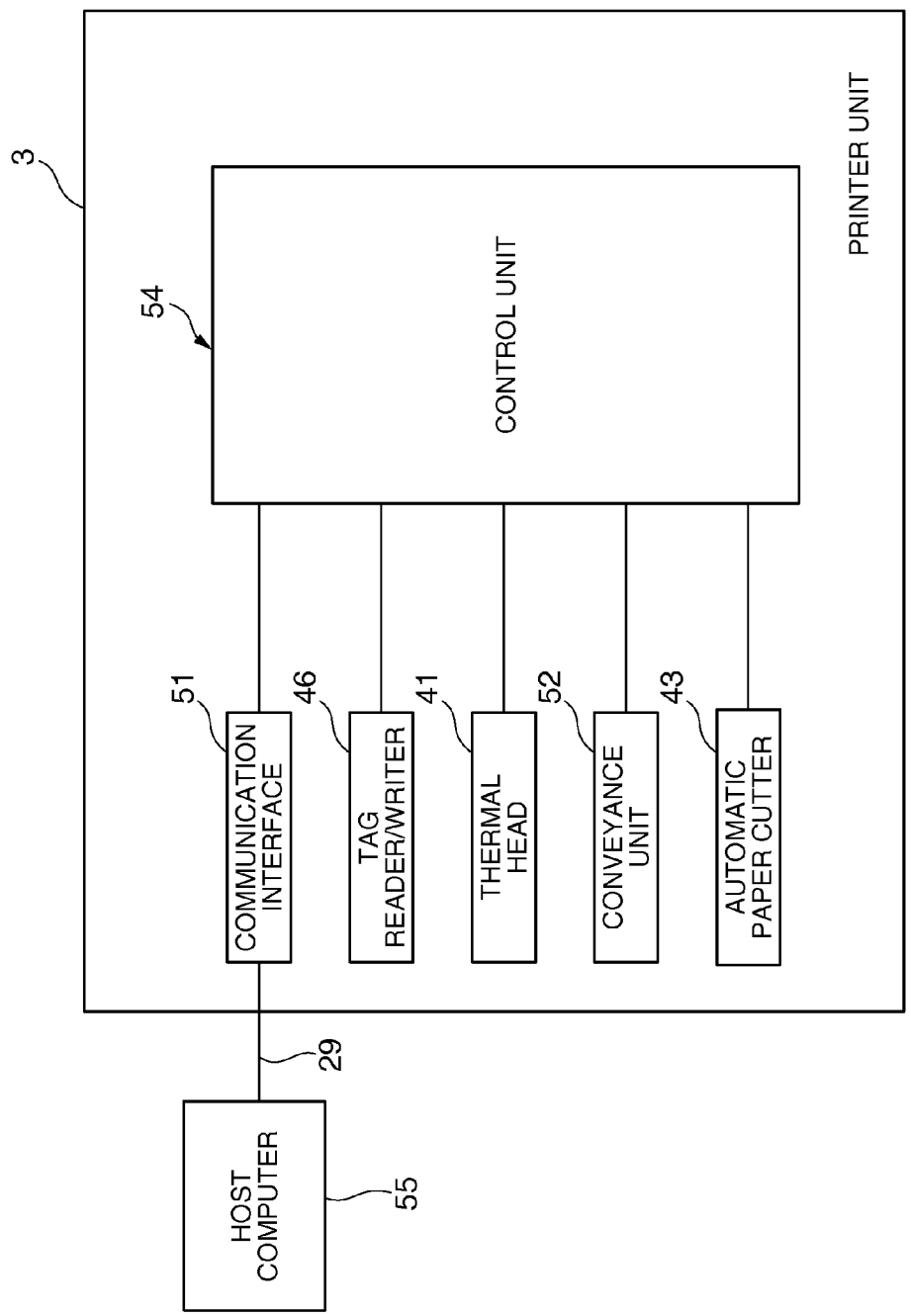
FIG. 4 is a function block diagram showing the configuration of the printer control system.

FIG. 4 is a function block diagram showing the configuration of the control system of the printer 1.

In addition to the parts described above, the printer 1 has a communication interface 51 that connects to the host computer 55, and a control unit 54 that controls parts of the printer 1. The communication interface 51 has a connector and interface circuit conforming to the USB standard, for example, and exchanges commands and data with the host computer 55.

The control unit 54 communicates commands and data with the host computer 55 through the communication interface 51, and controls the thermal head 41, tag reader/writer 46, a conveyance unit 52, and the automatic paper cutter 43. The conveyance unit 52 includes the platen roller 42, a paper feed motor (not shown in the figure) that drives the platen roller 42, and a gear train that connects the drive shaft of the paper feed motor with the platen roller 42.

Based on the print command and print data input from the host computer 55, the control unit 54 controls the conveyance unit 52 to convey a label 10, controls energizing the thermal head 41, and prints text, image, barcode, or other content on the label 10. For example, when the label 10 is used as a baggage tag, the airline company, airport of departure, destination airport, transit airports, the check-in counter where the baggage tag is issued, the boarding pass number, and the name or flight number of each flight.

The control unit 54 also controls the conveyance unit 52 to stop the RFID tag 10A in the label 10 to be printed at the upstream path slope 39A.

The control unit 54 also controls the tag reader/writer 46 to read and write data on the RFID tag 10A. More specifically, the control unit 54 controls the tag reader/writer 46 to read data stored in the IC chip of the RFID tag 10A, and then to write data corresponding to the content to be printed on the label 10 to the IC chip of the RFID tag 10A. For example, when the label 10 is a baggage tag as described above, the airline company, airport of departure, destination airport, transit airports, the check-in counter where the baggage tag is issued, the boarding pass number, and data identifying each flight, are written to the RFID tag 10A.

The control unit 54 also exchanges commands and data with the host computer 55 through the communication interface 51.

When the tag reader/writer 46 starts sending the carrier wave as described above, all RFID tags 10A located within reception range of this carrier wave turn on and return a response signal.

This embodiment of the disclosure therefore uses the directivity of the carrier wave output by the tag reader/writer 46 to appropriately design the location of the antenna 44 to the upstream path slope 39A so that the carrier wave is not received by any RFID tag 10A (IC tag disposed to the loaded medium) formed on the roll paper 7 other than the RFID tag 10A that is positioned on the upstream path slope 39A.

To facilitate description of the disclosure, FIG. 3 (B) shows the positioning of the label 10 paper in the printer 1 immediately after cutting a first label 10 at the trailing end of the label 10. More specifically, FIG. 3 (B) shows the next label 10 to be processed (that is, the label 10 used to produce the next baggage tag) immediately before the process related to producing the baggage tag starts.

As shown in FIG. 3 (B), before the process starts, the leading end of the label 10 is at the cutting position of the automatic paper cutter 43, and the RFID tag 10A of the label 10 is on the upstream path slope 39A. This is because the distance from the leading end of the label 10 used for the baggage tag to the RFID tag 10A is defined by a standard, and the length of the downstream path slope 39B, and other related parts and mechanisms, are designed based on this distance so that the RFID tag 10A is located on the upstream path slope 39A before the process starts.

Thus comprised, when a RFID tag 10A that can communicate is detected by the means described above when the process of producing a baggage tag using one label 10 starts, the RFID tag 10A of the label 10 to be processed (that is, the label 10 located on the upstream path slope 39A) will be detected unless some irregularity has occurred, such as a completed label 10 being near the printer 1.

The printer 1 described above continuously writes data to the IC tag of the medium and produces baggage tags as described below.

The basic operation of the printer 1 when producing a single baggage tag is described briefly. First, with the label 10 positioned as shown in FIG. 3 (B), the control unit 54 controls the conveyance unit 52 and the thermal head 41 to convey the label 10 and drive the thermal head 41 at the specific timing to print specific information at a specific position on the surface of the target label 10. While conveying the label 10, the control unit 54 also communicates with the RFID tag 10A at the appropriate timing to read required information or write required information. Control related to reading and writing data is described below.

After thus printing the required information on the surface of the label 10 and writing the required information to the RFID tag 10A, the control unit 54 controls the conveyance unit 52 to further convey the roll paper 7 until the trailing end of the target label 10 is at the cutting position of the automatic paper cutter 43. The control unit 54 then controls the automatic paper cutter 43 to cut the trailing end of the target label 10.

The label 10 is thus severed from the roll paper 7, and one baggage tag is produced.

Using the directivity of the carrier wave output by the tag reader/writer 46 to communicate with the RFID tags 10A on the roll paper 7, the printer 1 according to this embodiment of the disclosure thus prevents the carrier wave from reaching any RFID tag 10A on the roll paper 7 other than the RFID tag 10A located on the upstream path slope 39A. Structurally, however, if a label 10 that has already been processed (to which data has already been written), for example, is placed extremely close to the printer 1, it is possible that the carrier wave will also reach and be receivable by the RFID tag 10A of that label 10.

Because the RFID tag 10A will store the wrong information in this event if the information stored in the RFID tag 10A of the label 10 placed extremely close to the printer 1 is overwritten, writing data to the wrong RFID tag 10A must be prevented.

To prevent writing information to the wrong RFID tag 10A, the printer 1 according to this embodiment of the disclosure operates as described below.

Conditions for writing data to the RFID tag 10A of a target label 10 are described first.

The RFID tag 10A according to this embodiment of the disclosure uses EPC (Electronic Product Code) memory conforming to the Class 1 Generation 2 ("Gen 2") RFID standard proposed by EPCglobal, an RFID industry association, as the storage area.

Figure 5:
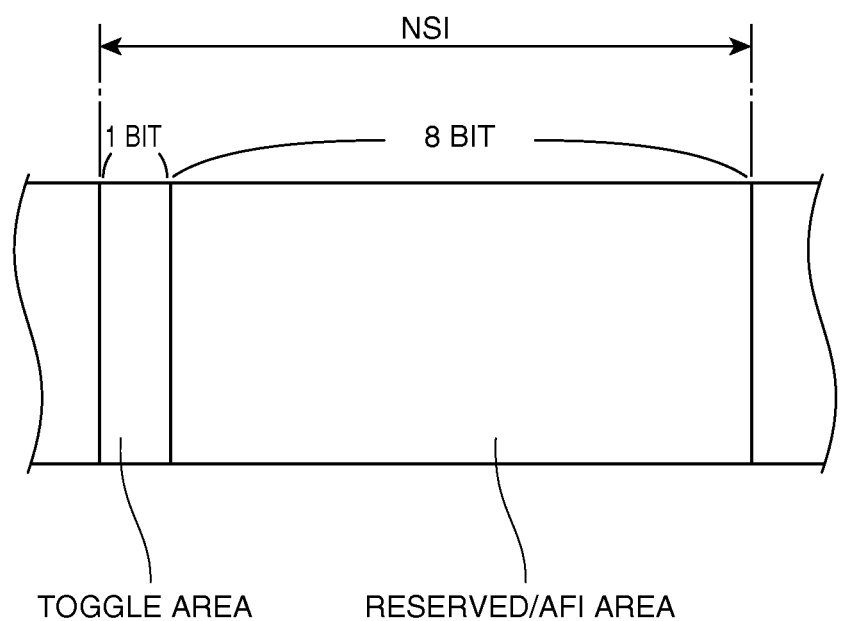
FIG. 5 shows the data structure of the main memory area of an RFID tag.

FIG. 5 shows main parts of the data structure of EPC Gen 2 memory.

As shown in FIG. 5, EPC Gen 2 memory has an NSI (Numbering System Identifier) field. The NSI field stores information indicating whether to use the EPC memory as an EPC field or as an AFI (Application Family Identifier)

field, and was included in the transition of the memory standard from an EPCGlobal standard to an ISO standard.

An AFI (Application Family Identifier) is an identifier assigned to each application (application group) expected to use an IC tag. As also shown in FIG. 5, the NSI field includes a 1-bit toggle area, and an 8-bit reserved/AFI area.

When EPC memory is used as an EPC field, all bits of the NSI are set to 0 based on the Gen 2 standard. Because EPC memory is created according to the Gen 2 standard when the RFID tag 10A is manufactured, all bits in the NSI will be 0 after the RFID tag 10A is shipped unless information is intentionally written to the NSI. All bits in the NSI being 0 is referred to as the initialized state.

The printer 1 according to this embodiment of the disclosure, however, uses EPC memory as an AFI field. To write baggage tag information to EPC memory, the control unit 54 writes a 1 to the NSI toggle area in accordance with IATA (International Air Transport Association) rules, and writes C1h to the reserved/AFI area. Writing specific information to the NSI field is a process essential to using EPC memory as an AFI field, and printers such as the printer 1 according to this embodiment of the disclosure that produce baggage tags in airports always write specific information to the NSI toggle area and the reserved/AFI area when writing information the RFID tag 10A.

The operation of a printer 1 according to this embodiment of the disclosure is described below based on the foregoing.

Figure 6:
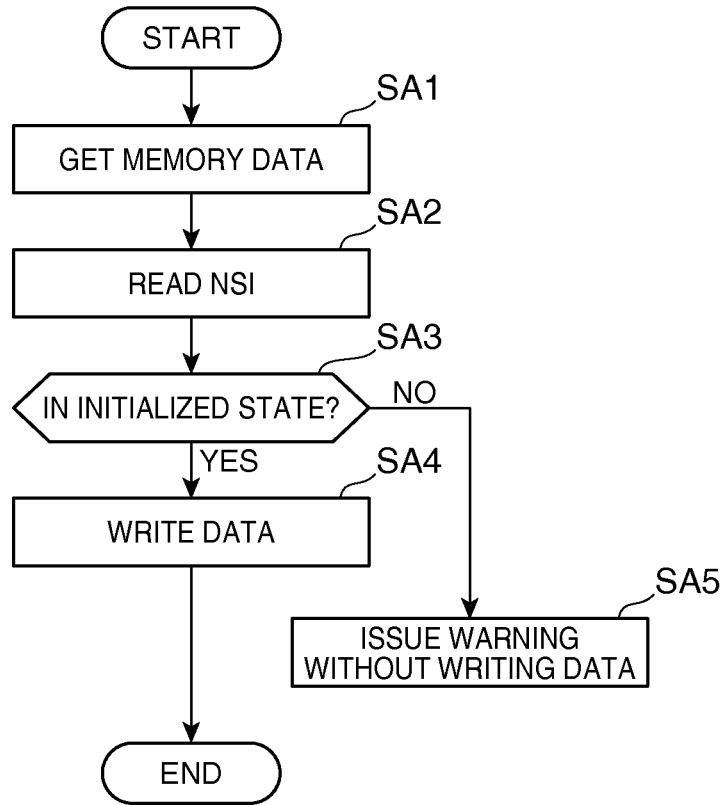
FIG. 6 is a flow chart of printer operation.

FIG. 6 is a flowchart showing the basic operation of the printer 1 when writing baggage tag information to the RFID tag 10A of a label 10. When the operation shown in the flowchart in FIG. 6 starts, the target label 10 is positioned as shown in FIG. 3 (B). The flow chart in FIG. 6 shows the operation of the printer 1 when writing information to the RFID tag 10A of a label 10 that is normally loaded.

Referring to FIG. 6, the control unit 54 of the printer 1 controls the tag reader/writer 46 to acquire memory data from the RFID tag 10A of a label 10 by communicating according to protocol (step SA1). This memory data is data of the same content and same data structure as EPC memory, and more specifically is the bit train of data in EPC memory.

Next, the control unit 54 references the NSI in the memory data (step SA2), and determines if the NSI is in the initialized state (step SA3). As described above, data has not been written even once to EPC memory when the NSI is in the initialized state, and if the NSI is not in the initialized state, information has been written at least once to EPC memory.

If in step SA3 the NSI is in the initialized state (step SA3 returns YES), the control unit 54 controls the tag reader/writer 46 to write specific information to specific areas in EPC memory (step SA4).

If the NSI is not in the initialized state (step SA3 returns NO), the control unit 54 reports the same and aborts the process without writing information (step SA5).

Whether or not information has already been written to the RFID tag 10A can thus be determined by determining if the NSI is in the initialized state.

Furthermore, because information has already been written if the NSI is not in the initialized state, accidentally writing information to a RFID tag 10A to which data has already been written can be prevented. Reporting that the NSI is not in the initialized state also enables the user to know that something is irregular.

Figure 7:
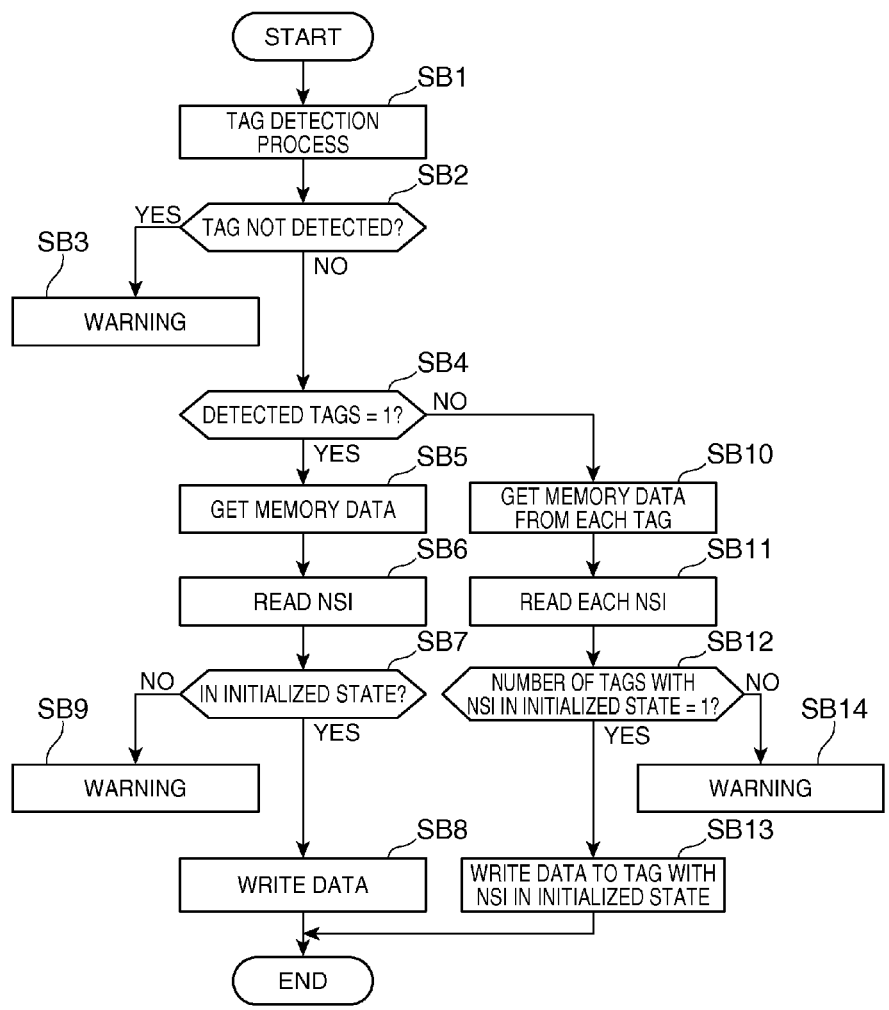
FIG. 7 is a flow chart of printer operation.

FIG. 7 is a flowchart showing in further detail the operation of the printer 1 when writing baggage tag information to the RFID tag 10A of the target label 10. When the operation shown in the flow chart in FIG. 7 starts, the target label 10 is positioned as shown in FIG. 3 (B).

The control unit 54 first controls the tag reader/writer 46 to execute a detection process that sends a detection signal and detects a RFID tag 10A that can communicate based on receipt of a response signal (step SB1).

Based on the result of the detection process in step SB1, the control unit 54 then determines if even one RFID tag 10A that can communicate was detected (step SB2). When even one RFID tag 10A that can communicate is not detected, either the RFID tag 10A of the target label 10 has failed for some reason, or the label 10 was pulled out and the label 10 is not correctly loaded in the printer 1.

If even one communicating label 10 is not detected (step SB2 returns YES), the control unit 54 issues a warning and aborts the process (step SB3). This is because writing data is not possible if there is not even one RFID tag 10A that can communicate, and an error may have occurred.

A warning can be issued by, for example, outputting specific data to the host computer 55 to display information indicating that even one RFID tag 10A that can communicate was not detected on the display panel of the host computer 55, or if the printer 1 has an LED or display panel, driving the LED in a specific way or displaying appropriate information on the display panel. This also applies to warnings in other situations such as described below.

The warning issued in step SB3 enables the user to quickly and reliably know that not even one RFID tag 10A that can communicate was detected, and take appropriate action (such as determine the cause).

If step SB2 does not determine that there is not even one RFID tag 10A that can communicate (that is, detects a RFID tag 10A that can communicate) (step SB2 returns NO), the control unit 54 determines if only one RFID tag 10A was detected (step SB4).

If only one RFID tag 10A was detected (step SB4 returns YES), the control unit 54 controls the tag reader/writer 46 to acquire memory data from the one detected RFID tag 10A by communicating according to protocol (step SB5). This memory data is data of the same content and same data structure as EPC memory, and more specifically is the bit train of data in EPC memory.

Next, the control unit 54 references the NSI in the memory data (step SB6), and determines if the NSI is in the initialized state (step SB7). As described above, data has not been written even once to EPC memory when the NSI is in the initialized state, and if the NSI is not in the initialized state, information has been written at least once to EPC memory.

If in step SB7 the NSI is in the initialized state (step SB7 returns YES), the control unit 54 controls the tag reader/writer 46 to write specific information to specific areas in EPC memory (step SB8).

That there is one detected RFID tag 10A and the NSI of the RFID tag 10A is in the initialized state means that a target label 10 to which data has still not been written is set to the expected normal position, and another RFID tag 10A that can also communicate is not near the printer 1. The control unit 54 therefore writes information to the detected RFID tag 10A.

However, if the NSI is not in the initialized state (step SB7 returns NO), the control unit 54 reports the same and aborts the process (step SB9). There could be one RFID tag 10A that can communicate while the NSI of that RFID tag 10A is not in the initialized state as described below.

More specifically, the target label 10 could be positioned in the incorrect position, and a completed baggage tag could be near the printer 1. In this event, information has already been written to the communicating RFID tag 10A, and if information is written to that RFID tag 10A, the previously written information will be overwritten, and information other than the intended (correct) information will be stored in the RFID tag 10A. Writing new information must therefore be prevented. Processing therefore stops and a warning is issued in step SB9. This warning enables the user to quickly and reliably know that not even one RFID tag 10A that can communicate was detected, and take appropriate action (such as determine the cause).

If the control unit 54 determines in step SB4 that the number of detected RFID tags 10A is not one (that is, plural RFID tags 10A were detected) (step SB4 returns NO), the control unit 54 communicates with each of the plural RFID tags 10A by protocol, and gets the memory data of each RFID tag 10A (step SB10). Next, the control unit 54 references each NSI in the acquired memory data (step SB11), and determines if the number of RFID tags 10A having a NSI in the initialized state is one (step SB12).

If there is only one RFID tag 10A with an NSI in the initialized state in the group of plural detected RFID tags 10A (step SB12 returns YES), the control unit 54 controls the tag reader/writer 46 to write the required information to the specific area in the EPC memory of the RFID tag 10A with the NSI in the initialized state (step SB13).

Plural RFID tags 10A may be detected with only one of the plural RFID tags 10A having an NSI in the initialized state. More specifically, this can happen when a target label 10 to which data has not been written is set to the expected normal position, and a completed baggage tag is also near the printer 1. Because information can be written appropriately to the correct RFID tag 10A if data is written to the RFID tag 10A having the NSI in the initialized state, the control unit 54 writes information to the RFID tag 10A having the NSI in the initialized state.

However, if step SB12 determines that, within the group of plural detected RFID tags 10A, the number of RFID tags 10A with an NSI in the initialized state is not 1, in other words, the number of initialized RFID tags 10A is 0 or 2 or more (step SB12 returns NO), the control unit 54 reports the same and aborts the process (step SB14).

This can happen when there are plural RFID tags 10A that can communicate, and the number of RFID tags 10A with an NSI not in the initialized state is 0. This can occur, for example, when the target label 10 is not set to the correct position for some reason, and plural completed baggage tags are placed near the printer 1. When this happens, data has already been written to all of the RFID tags 10A that can communicate, and if information is written to any of the RFID tags 10A, the previously written information will be overwritten, and information other than the expected information will be stored in the RFID tag 10A. Writing new information must therefore be prevented.

This also happens when there are plural RFID tags 10A that can communicate, and the number of RFID tags 10A with an NSI not in the initialized state is 2 or more. This can occur, for example, when the target label 10 is set to the correct position, and an unprocessed label 10 to which information has not been written is placed near the printer 1 for some reason. When this happens, if information is written to any of the RFID tags 10A, the information can also be written to the RFID tag 10A of a label 10 other than the target label 10. Writing new information must therefore be prevented.

The control unit 54 therefore aborts the process and issues a warning in step SB14. In other words, the control unit 54 does not write information to any RFID tag 10A. Writing information to a RFID tag 10A that should not be written can therefore be reliably prevented.

As described with reference to the flow chart in FIG. 7, when plural RFID tags 10A that can communicate are detected, and only one of these RFID tags 10A has an NSI in the initialized state, this embodiment of the disclosure writes information to that one RFID tag 10A.

However, the disclosure is not limited to a specific number of RFID tags 10A having an NSI in the initialized state, and an embodiment that does not write information any of the RFID tags 10A when plural RFID tags 10A that can communicate are detected is also conceivable. More specifically, an embodiment that does not write information when plural RFID tags 10A that can communicate are detected and there is only one RFID tag 10A with an NSI in the initialized state is also possible.

This configuration can reliably prevent accidentally writing information to the wrong RFID tag 10A.

As described above, this embodiment of the disclosure assures that the NSI (a specific area in the storage space of an IC tag) in the EPC memory of the RFID tag 10A is maintained in the initialized state before writing information to the RFID tag 10A. The control unit 54 of the printer 1 writes predetermined information (specific information) to the toggle area of the NSI and the reserved/AFI area according to IATA standards when writing information to the RFID tag 10A of a label 10, and to write information to the RFID tag 10A, determines if the NSI is in the initialized state, and writes the information if the NSI is in the initialized state.

This embodiment of the disclosure can therefore determine if information has already been written to the RFID tag 10A using the NSI in EPC memory, and can therefore prevent accidentally writing information to an RFID tag 10A if information was already written and the RFID tag 10A is therefore not a target for writing information.

To write information to the RFID tag 10A of a label 10, the control unit 54 determines if the target NSI is in the initialized state by means of the tag reader/writer 46, and does not write information if the tag is not in the initialized state.

This embodiment of the disclosure can therefore prevent accidentally writing information to an RFID tag 10A to which information was already written.

The control unit 54 in this embodiment sends a radio signal and detects a RFID tag 10A that can communicate when writing information to the RFID tag 10A by the tag reader/writer 46. If a plurality of RFID tags 10A are detected and there is not just one RFID tag 10A with an NSI in the initialized state, information is not written to any RFID tag 10A. However, if there is just one RFID tag 10A with an NSI in the initialized state, information is written to that RFID tag 10A.

This embodiment can prevent writing information to an IC tag to which data should not be written, and make the RFID tag 10A to which data should be written the target for writing information.

To writing information to a RFID tag 10A by the tag reader/writer 46, the control unit 54 can alternatively broadcast a radio signal to detect an RFID tag 10A that can communicate, and not write information to any detected RFID tag 10A if plural RFID tags 10A are detected.

This embodiment can reliably prevent writing information accidentally to an unintended IC tag.

Further alternatively, to write information to an RFID tag 10A, the control unit 54 broadcasts a radio signal by the tag reader/writer 46 and detects a tag that can communicate, and issues a warning in a specific manner if one or plural RFID tags 10A are detected and all of the detected RFID tags 10A have an NSI that is not in the initialized state.

This embodiment can reliably prevent writing unintended information to an RFID tag 10A, and quickly and reliably detect an irregular condition.

Further alternatively, to write information to an RFID tag 10A, the control unit 54 broadcasts a radio signal by the tag reader/writer 46 and detects a tag that can communicate, and issues a warning in a specific manner if one or plural RFID tags 10A are detected and two or more of the detected RFID tags 10A have an NSI that is in the initialized state.

This embodiment can reliably prevent writing unintended information to an RFID tag 10A, and quickly and reliably detect an irregular condition.

The printer 1 according to this embodiment of the disclosure is configured so that roll paper 7 (media) having consecutive RFID tags 10A affixed (disposed) thereto with a specific gap between RFID tags 10A can be loaded. The control unit 54 controls a conveyance unit 52 that conveys the media, and a tag reader/writer 46, and can continuously write information to the RFID tags 10A on the roll paper 7 while conveying the roll paper 7. The printer 1 is configured so that the radio signal broadcast by the tag reader/writer 46 is not received by any of the RFID tags 10A on the loaded roll paper 7 other than the RFID tag 10A (the target RFID tag 10A for writing information) on the upstream path slope 39A.

Thus comprised, when something is irregular, such as media having an IC tag to which information has already been written is near the printer 1 for some reason, the NSI of an RFID tag 10A may be determined to not be in the initialized state when attempting to write data, and accidentally writing information to an RFID tag 10A to which information should not be written can be prevented more effectively.

A preferred embodiment of the disclosure is described above, but the disclosure is not so limited.

For example, that a specific area in the storage area of the IC tag is in a specific state in the foregoing embodiment is that the NSI is in the initialized state. However, that a specific area in the storage area of the IC tag is in a specific state is not limited to the NSI being in the initialized state. More specifically, if in the storage area of the IC tag there is an area (a specific area) where a specific state is maintained and that specific state will change if information is written to the IC tag, the disclosure can be applied using that area.

The foregoing is described with a conveyance path having an upstream path slope 39A, downstream path slope 39B, and horizontal path 39C through which label 10 paper is conveyed inside the printer case 11, but the slope of the label 10 paper conveyance path, the location of the thermal head 41, and the location of the automatic paper cutter 43, for example, can be changed as desired.

The antenna 44 of the tag reader/writer 46 may also be appropriately disposed facing the label 10 conveyance path, and may be near the paper entrance 26 or the paper exit 28, for example, but a central location inside the printer case 11 as shown in FIG. 3 (A) is preferable considering leakage of the radio signal outside the printer case 11.

Furthermore, the label 10 paper used as media with embedded RFID tags 10A is not limited to be loaded as roll paper 7 in a paper feed device 2 near the printer unit 3. For example, the RFID tags 10A could be disposed to cut-sheet paper, and this cut-sheet paper could be stacked near the printer unit 3, or roll paper 7 could be held separated from the printer unit 3. The tag reader/writer 46 could also be disposed separately from the printer case 11.

The printer 1 is also not limited to a configuration having a thermal head 41 that prints on thermal label 10 paper, and the disclosure can also be applied to an inkjet printer, laser printer, or dot impact printer, for example.

A buzzer, light-emitting unit, display screen, or other means for reporting an error can also be disposed to the printer 1, and other details of the configuration can also be changed as desired.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

A media processing device according to one aspect of the disclosure comprises a data read/write unit configured to write information to an IC tag of media, and to read information from the IC tag, by radio signal; and a control unit configured to control writing and reading the IC tag by the data read/write unit, wherein the control unit is configured to determine if a specific area in the storage space of the IC tag is in a specific state and to control the data read/write unit to write information to the IC tag if the specific area is in the specific state.

An IC tag characteristically has a specific area in the storage area of the IC tag that is maintained in a specific state before information is written by the data read/write unit and the specific state of the specific area changes when information is written to the IC tag. The disclosure uses this characteristic to determine if information has already been written to the IC tag, and can determine if the IC tag is a target for writing.

In a media processing device according to another aspect of the disclosure, the control unit does not write information to the IC tag if the control unit determines the specific area in the storage space of the IC tag is not in the specific state.

This aspect of the disclosure can prevent accidentally writing information to an IC tag to which information was already written.

In a media processing device according to another aspect of the disclosure, the data read/write unit broadcasts a radio signal and detects an IC tag that can communicate; and the control unit determines the number of detected IC tags when the data read/write unit detects an IC tag that can communicate.

This aspect of the disclosure can execute an appropriate process according to the number of detected IC tags.

In a media processing device according to another aspect of the disclosure, when the number of detected IC tags is 2 or more, the control unit determines if a specific area in each detected IC tag is in the specific state, and if the number of IC tags in which the specific area is in the specific state is 1, writes to the IC tag having the specific area in the specific state.

If for some reason plural IC tags that can communicate are detected, and the number of IC tags in which the specific area is in the initialized state is not 1, the IC tag for writing data cannot be determined. By not writing information to any of the IC tags in this situation as described above, writing information to an IC tag that should not be a target for writing can be prevented. However, if the number of IC tags in which the specific area is in the initialized state is 1, the probability that that IC tag is a target for writing is high, and by writing information to that IC tag in this event, the IC tag to which information should be written can be made the target for writing information.

In a media processing device according to another aspect of the disclosure, when the number of detected IC tags is 2 or more, the control unit does not write to the detected IC tags.

If there are plural IC tags that can communicate, an IC tag to which information should not be written has been unexpectedly placed where communication is possible. By not writing information to any IC tag in this event, accidentally writing information to an unintended IC tag can be reliably prevented.

In a media processing device according to another aspect of the disclosure, the media includes a plurality of IC tags disposed with an interval therebetween; a conveyance unit is configured to convey the media; and the data read/write unit is configured to write to the IC tag conveyed to a data read/write position by the conveyance unit.

This aspect of the disclosure can prevent information being written accidentally when writing to an IC tag disposed to the media.

Another aspect of the disclosure is a control method of a media processing device, comprising: conveying an IC tag disposed to media to a data read/write position; determining if a specific area in the storage space of the IC tag is in a specific state after the IC tag is conveyed to the data read/write position; and if the specific area is in the specific state, writing to the IC tag.

An IC tag characteristically has a specific area in the storage area of the IC tag that is maintained in a specific state before information is written by the data read/write unit and the specific state of the specific area changes when information is written to the IC tag. The control method according to this aspect of the disclosure uses this characteristic to determine if information has already been written to the IC tag, and can determine if the IC tag is a target for writing.

A control method according to another aspect of the disclosure further comprises detecting the number of IC tags after the IC tag is conveyed to the data read/write position; determining the number of detected IC tags; and if the number of IC tags is 1, determining if a specific area in the storage space of the IC tag is in the specific state.

The control method according to this aspect of the disclosure can execute an appropriate process according to whether or not the number of IC tags is 1, or whether or not a specific area in the storage space of the IC tag is in a specific state.

As described above, the disclosure can determine whether or not an IC tag is a target for writing.

Other objects and attainments together with a fuller understanding of the disclosure will become apparent and appreciated by referring to the following description and claims taken in conjunction with the accompanying drawings.

What is claimed is:

1. A media processing device configured to process media having an Integrated Circuit (IC) tag, comprising:
    a data read/write unit configured to communicate with the IC tag by radio signal; and
    a controller configured to read a storage space of the IC tag and to perform a writing process to write information to the storage space by controlling the data read/write unit; wherein,
    the controller reads a storage space, to which a predetermined data is written when the writing process is performed, and then determines whether the predetermined data have been written to a predetermined area in the storage space;
    when the controller determines that the predetermined data have not been previously written to the predetermined area, the controller performs the writing process with writing the predetermined data to the predetermined area,
    when the controller determines that the predetermined data have been previously written to the predetermined area, the controller does not perform the writing process, and
    when the controller determines that the predetermined data can be written to a second area based on determining that the second area and the predetermined area are within a reading and writing range of the data read/write unit, the controller communicates with the predetermined area and the second area, gets memory data of each area, references a NSI (Numbering System Identifier) in the memory data of each area, and determines whether the NSI of the predetermined area and the second area are initialized, the controller performing the writing process to an area of either the predetermined area or the second area with writing to its NSI,
    wherein if the predetermined area has its NSI initialized and the second area does not have its NSI initialized, the controller performs the writing process to the predetermined area, or if the predetermined area does not have its NSI initialized and the second area has its NSI initialized, the controller performs the writing process to the second area, and the controller does not perform the writing process and provides a warning notification if the predetermined area has its NSI initialized and if the second area has its NSI initialized.

2. The media processing device described in claim 1, wherein the controller prevents writing of information to the IC tag in an event the controller determines data have been at least once previously written to the predetermined area in the storage space of the IC tag.

3. The media processing device described in claim 1, wherein
    the data read/write unit broadcasts a radio signal and detects an IC tag that can communicate; and
    the controller determines a number of detected IC tags when the data read/write unit detects an IC tag that can communicate.

4. The media processing device described in claim 3, wherein
    when the number of detected IC tags is 2 or more, the controller determines whether data have been previously written to a predetermined area of each of the detected IC tags, and, if the number of IC tags in which data have not been previously written to its predetermined area is 1, writes to the IC tag which has not had data previously written to its predetermined area.

5. The media processing device described in claim 3, wherein
    when the number of detected IC tags is 2 or more, the controller prevents writing of information to the detected IC tags.

6. The media processing device described in claim 1, wherein
    the media includes a plurality of IC tags disposed with an interval therebetween;
    a conveyance unit is configured to convey the media; and the data read/write unit is configured to write to the IC tag conveyed to a data read/write position by the conveyance unit.

7. A control method of a media processing device comprising a data read/write unit, the method comprising:
  conveying an Integrated Circuit (IC) tag disposed to media to a data read/write position;
  reading a storage space of the IC tag, then determining whether data have been previously written to a predetermined area in the storage space, after the IC tag is conveyed to the data read/write position corresponding to a location of the read/write unit;
  detecting a number of IC tags, then determining the number of IC tags after the IC tag is conveyed to the data read/write position;
  in an event data have been previously written to the predetermined area, or in an event the number of the IC tags having an NSI (Numbering System Identifier) in an initialized state is more than 1, providing a warning notification and preventing the data from being written to the predetermined area and to the IC tags; and
  in an event data have not been previously written to the predetermined area and the number of IC tags is 1, writing information to the IC tag.

8. A media processing device configured to process media having an Integrated Circuit (IC) tag, comprising:
  a data read/write unit configured to communicate with the IC tag by radio signal, and
  a controller configured to read a storage space of the IC tag and to perform a writing process to write information to the storage space, by controlling the data read/write unit; wherein,
  the controller controls the data read/write unit to read a predetermined area in the storage space, to which predetermined data is written when the writing process is performed, determines whether the predetermined data have been written to the predetermined area, and controls the data read/write unit to identify a number of detected IC tags,
  when the controller determines that the predetermined data have not been written to the predetermined area or the number of detected IC tags having an NSI (Numbering System Identifier) in an initialized state is more than 1, the controller provides a warning notification and does not perform the writing process, and
  when the controller determines that the predetermined data have not been written to the predetermined area and the number of detected IC tags is 1, the controller performs the writing process.

9. The media processing device described in claim 1, wherein the IC tag which has not had data previously written to its predetermined area, is referred to IC tag in which all bits in the predetermined area is 0.

* * * * *